Figure 1:
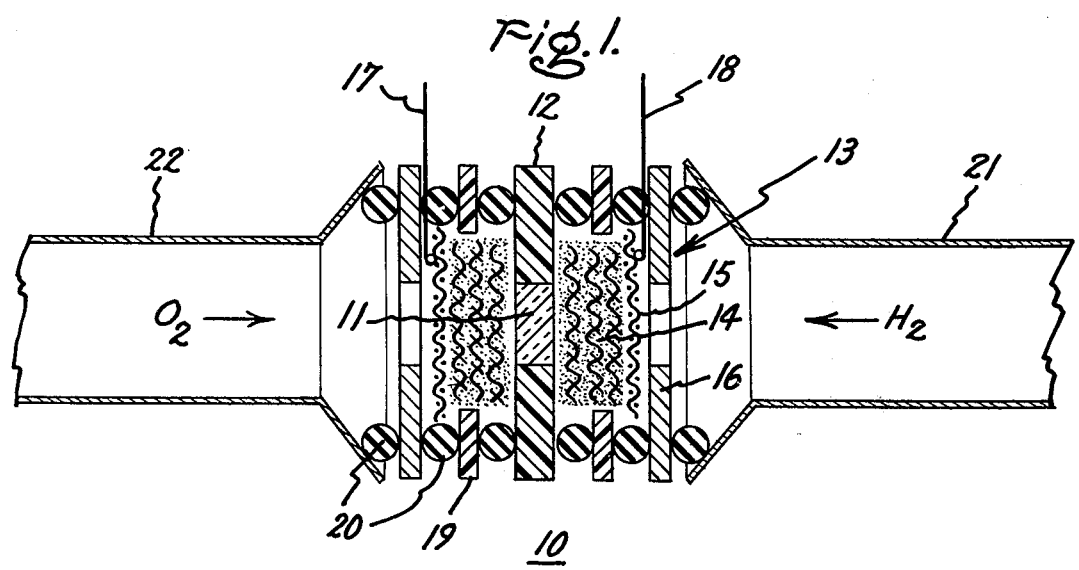

United States Patent [19]

Dubin et al.

[11] 4,032,694

[45] June 28, 1977

[54] FUEL CELL WITH HYDRONIUM BETA-ALUMINA ELECTROLYTE

[75] Inventors: Robert R. Dubin, Ballston Lake; Walter L. Roth, Schenectady, both of N.Y.

[73] Assignee: General Electric Company, Schenectady, N.Y.

[22] Filed: Aug. 26, 1976

[21] Appl. No.: 717,896

[52] U.S. Cl. ............................................. 429/33
[51] Int. Cl.² ...................................... H01M 8/10
[58] Field of Search ...................................... 429/33

[56] References Cited

UNITED STATES PATENTS

| | | |
|---|---|---|
| 3,266,940 | 8/1966 | Caesar ................................. 429/33 |
| 3,475,223 | 10/1969 | Kummer et al. ..................... 429/33 |

*Primary Examiner*—John H. Mack
*Assistant Examiner*—H. A. Feeley
*Attorney, Agent, or Firm*—Paul R. Webb, II; Joseph T. Cohen; Jerome C. Squillaro

[57] ABSTRACT

A gaseous fuel cell is disclosed which has a solid hydronium beta-alumina electrolyte positioned between and in direct electrical contact with a pair of gas permeable, electronically conductive electrodes.

4 Claims, 2 Drawing Figures

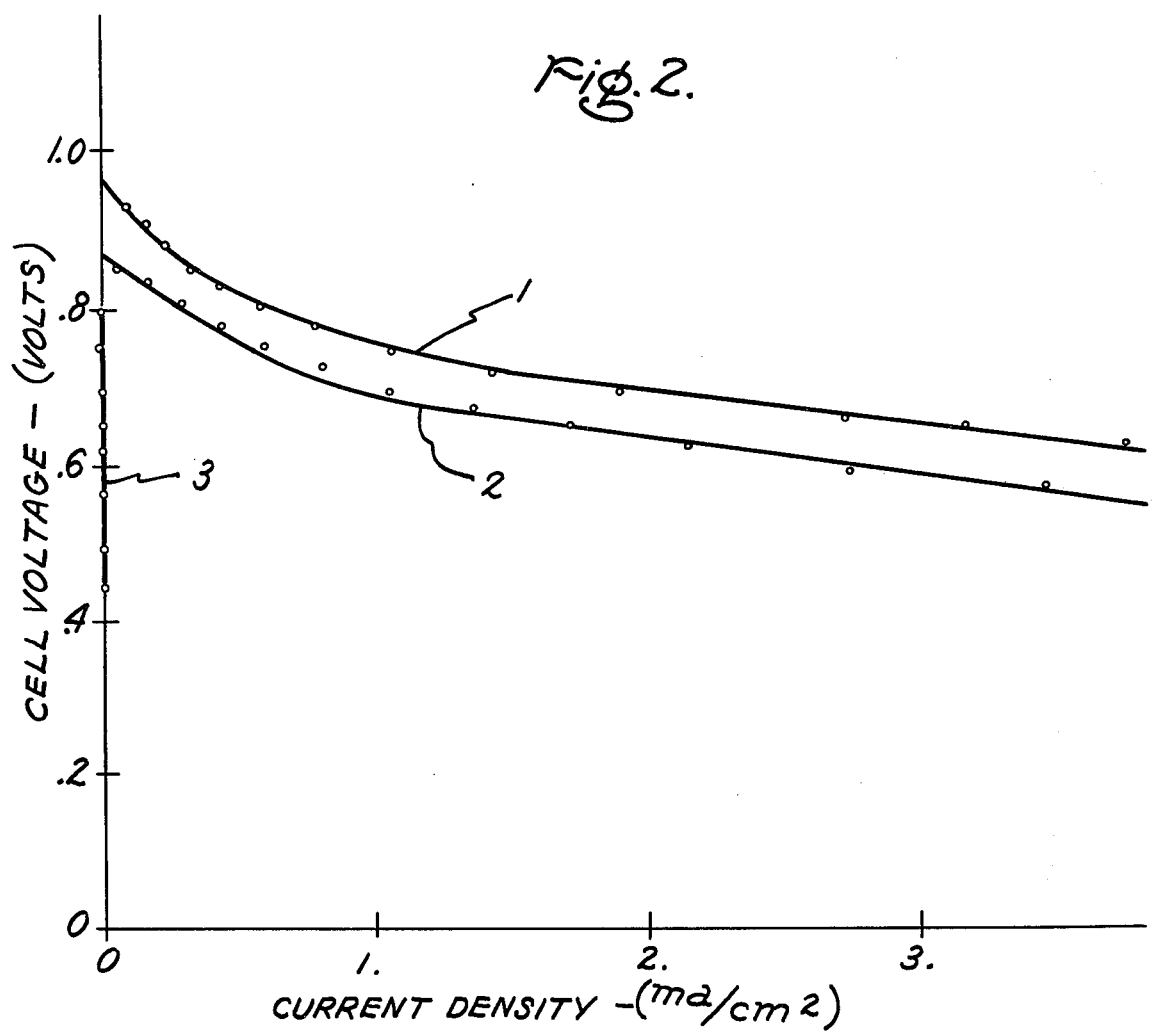

FUEL CELL WITH HYDRONIUM BETA-ALUMINA ELECTROLYTE

This invention relates to gaseous fuel cells. More particularly, this invention relates to improved gaseous fuel cells comprising a solid hydronium beta-alumina electrolyte positioned between and in direct electrical contact with a pair of gas permeable, electronically conductive electrodes. These electrodes used in combination with the solid hydronium beta-alumina electrolyte produce gaseous fuel cells which are ideally suited for generation of electricity. The complete discharge cycle to which these devices are subjected places severe requirements on the electrodes and electrolyte structure of the cells with regard to stability and nonpolarization during operation.

Our present invention is directed to a moderate temperature, gaseous fuel cell with a solid hydronium beta-alumina electrolyte positioned between the adjacent chambers.

An object of this invention is to provide a fuel cell having a high volume efficiency, low polarization and high stability during operation.

In accordance with one aspect of our invention, a gaseous fuel cell employs a solid hydronium beta-alumina electrolyte positioned between and in direct electrical connection with a pair of gas permeable, electronically conductive electrode elements, and means for supplying a hydrogen containing fuel gas containing water vapor to one of the electrodes and means for supplying an oxygen oxidant gas to the other of the electrodes.

These and various other objects, features and advantages of the invention will be better understood from the following description taken in connection with the accompanying drawing in which:

FIG. 1 is a diagrammatic sectional view of a gaseous fuel cell made in accordance with our invention; and FIG. 2 is a graph of fuel cell performance of the type shown in FIG. 1 in which cell voltage in volts is plotted against current density in millamperes per square centimeter.

In FIG. 1 of the drawing, there is shown generally at 10 a gaseous fuel cell embodying our invention. Cell 10 has a disc 11 of solid hydronium beta-alumina with its edges sealed in an epoxy mount 12 to facilitate mounting in fuel cell 10. Each electrode 13 comprises a gas permeable, electronic conductive element 14, a platinized platinum screen 15, and a metallic backing plate 16. Element 14 comprises a carbon gauze with a dispersion of platinum black in electronic contact with disc 11. Screen 15 is pressed against element 14 and held in position by a metallic backing plate 16. A pair of electrical leads 17 and 18 are connected to the respective screen 15 and extend outwardly from fuel cell 10 to deliver electrical current to the apparatus being operated by the cell during discharge operation. Electrolyte disc 11 and the elements of electrode 13 are held in position by insulating gaskets 19 and insulating rings 20 which gaskets and rings seal together cell 10 and render it leaktight. A fuel gas manifold 21 is shown diagramatically as both the fuel gas inlet and outlet. Similarly an oxygen oxidant gas manifold 22 is shown diagramatically as both the oxygen oxidant gas inlet and outlet. Both manifolds 21 and 22 are sealed together around the electrodes and electrolyte in gas-tight relationship by any suitable means such as bolts, insulating washers and nuts (not shown). An insulating O-ring 20 is shown positioned between each backing plate and the interior surface of the respective manifold.

Although a number of different types of electrode structures are suitable for use in the cells of the present invention, each electrode should be one which: is an electronic conductor, will absorb the fuel or oxidant employed, and will not itself oxidize severely under the operating conditions of the cell. Electrodes may also serve as catalysts. Suitable catalysts are well known and many are described for example, in "Catalysts, Inorganic and Organic," Berkman, Morrel and Egloff, Reinhold Publishing Co., New York (1940); "Catalytic Chemistry," H. W. Lohse, Chemical Publishing Co., Inc., New York (1945); etc. Since the absorption of gases on solids is a surface phenomenon, it is desirable that the electrodes be of the maximum practicable surface area and that the surface preferably be in its most active state for the adsorption of gases. Also, for maximum cell efficiency each electrode should cover, as uniformly as possible, the entire effective major surface of the electrolyte. The effective area is that area which is in contact with the fuel gas.

The cell produced with this electrolyte is operable at room temperature and atmospheric pressure. If desired, the cell may be operated above or below ambient atmospheric conditions of temperature and pressure. To avoid rupture of the electrolyte, pressure of the fuel gas and oxidant gas in contact with the electrolyte should preferably be equal but in no case should the pressure difference exceed the ability of an electrolyte to withstand the force.

The hydronium beta-alumina was synthesized in a polycrystalline form by exposing a disk of sodium beta-alumina, doped with nominal amounts of MgO and $Y_2O_3$, of nominal 1 cm. diameter and 1 mm. thickness to 97% $H_2SO_4$ at 325° C for 85 hours. The conversion of sodium beta-alumina to hydronium beta-alumina was established by x-ray diffraction and infrared spectrometry. Chemical analysis of the exchange acid indicated 80% to 90% conversion of the starting material to hydronium beta-alumina. Hydronium beta-alumina formed in this way was then sealed into epoxy for use in a fuel cell. Discs prepared in this manner proved leak tight under a helium pressure test. It should be appreciated that methods of electrolyte synthesis alternate to the one described above might be successfully employed to produce hydronium beta-alumina suitable for use in this invention. These methods might include electrolysis from acid electrolyte or exchange with water vapor and/or $H_2$ at a catalytic surface or exchange from the silver-beta-alumina.

The hydronium beta-alumina provides a solid ion-conductive electrolyte of high strength and integrity. There is flexibility in the fabrication methods. The materials are inexpensive. The hydronium beta-alumina electrolyte functions well in a fuel cell which is highly corrosive to electrolyte materials.

We found unexpectedly that hydronium beta-alumina functioned as a solid ion-conductive electrolyte in a fuel cell. We found further that we can employ an oxygen oxidant gas, such as oxygen. We found also that we can employ a hydrogen containing fuel gas such as hydrogen. We found further such a fuel cell functions satisfactorily only if the hydrogen containing fuel gas contains water vapor.

In the operation of the present fuel cell, the oxygen oxidant gas, such as oxygen, is supplied from a storage source (not shown) through the inlet portion of manifold 22 to its associated electrode. Any impurities are removed through the outlet portion of the manifold 22. The hydrogen containing fuel gas, such as hydrogen, is supplied from a storage source (not shown) through the inlet portion of manifold 21 to its associated electrode. The gas is saturated with water vapor before supplying it to manifold 21 or the gas is saturated with water vapor in the manifold. Any inpurities are removed through the outlet portion of manifold 21.

With hydronium beta-alumina electrolyte, the mobile ions are hydrogen containing ions in the form of $H_3O^+$ or $H^+$. The respective discharge reactions at the fuel gas electrode and at the oxygen oxidant gas electrode are as follows:

(1)

(2)

Examples of fuel cells with hydronium beta-alumina electrolytes made in accordance with our invention are set forth below:

EXAMPLE 1

A fuel cell was assembled as shown in FIG. 1 of the drawing and as described above. The solid hydronium beta-alumina electrolyte was prepared from a sodium beta-alumina, doped with nominal amounts of MgO and $Y_2O_3$, of nominal 1 cm. diameter and 1 mm. thickness after exposure to 97% $H_2SO_4$ at 325° C for 85 hours. The conversion of sodium beta-alumina to hydronium beta-alumina was established by x-ray diffraction and infrared spectrometry. Chemical analysis of the exchange acid indicated 80% to 90% conversion of the starting material to hydronium beta-alumina. Hydronium beta-alumina formed in this way was then sealed into epoxy. The opposite surfaces of the epoxy coated and impregnated disc were then sanded to expose the opposite surfaces of the disc and provide the disc with an epoxy mount. The disc mounted in epoxy was then subjected to a helium pressure test which disclosed that the disc was leak tight. The fuel gas of hydrogen and oxygen oxidant of oxygen were flowed into the respective inlet portions of their manifolds at atmospheric pressure. The hydrogen was saturated with water vapor before being flowed into the manifold. The performance of the cell operating at 24° C is shown by curve 1 in FIG. 2 of the drawing.

EXAMPLE 2

The fuel cell of Example 1 was employed for this example. However, prior to the operation of the cell, the hydronium beta-alumina electrolyte was heated to slightly above 100° C for about 1 hour and then cooled to 24° C. The subsequent performance of the cell operated under the same conditions as in Example 1 is shown by curve 2 in FIG. 2 of the drawing. Comparison of curves 1 and 2 shows the ohmic resistance was unchanged (1380 ohms) indicating stability of the system under heat cycling conditions.

EXAMPLE 3

The fuel cell of Example 1 was employed for this example. However, as opposed to our invention, the hydrogen was not saturated with water vapor but it was supplied dry to its respective manifold. The subsequent performance of the cell operated under the same conditions as in Example 1, except for the water vapor saturation of the hydrogen, is shown by curve 3, in FIG. 2 of the drawing. Curve 3 shows that steady state currents could not be established at 24° C or at 46° C thereby showing that water vapor saturation of the hydrogen containing fuel gas is essential for operation of the fuel cell.

While other modifications of the invention and variations thereof which may be employed within the scope of the invention have not been described, the invention is intended to include such as may be embraced within the following claims:

What we claim as new and desire to secure by Letters Patent of the United States is:

1. A gaseous fuel cell comprising a solid doped hydronium beta-alumina electrolyte which is positioned between and in direct electrical contact with a pair of gas permeable, electronically conductive electrodes, and means for supplying a hydrogen containing fuel gas containing water vapor to one of said electrodes and means for supplying an oxygen oxidant gas to the other end of said electrodes.

2. A gaseous fuel cell as in claim 1, in which the fuel gas is hydrogen and, the oxidant gas is oxygen.

3. A gaseous fuel cell comprising a fuel gas chamber separated from an oxidant chamber by a solid doped hydronium beta-alumina electrolyte, a gas permeable, electronically conductive electrode in contact with the fuel gas and electrolyte, another gas permeable, electronically conductive electrode in contact with the oxidant gas and electrolyte, a supply of a hydrogen containing fuel gas containing water vapor for the fuel gas chamber, and a supply of an oxygen oxidant gas for the oxidant gas chamber.

4. A gaseous fuel cell as in claim 3, in which the fuel gas is hydrogen and, the oxidant gas is oxygen.

* * * * *